(12) United States Patent
Mao et al.

(10) Patent No.: US 9,863,500 B2
(45) Date of Patent: Jan. 9, 2018

(54) GEARBOX

(71) Applicant: Johnson Electric S.A., Murten (CH)

(72) Inventors: Wei Xing Mao, Shenzhen (CN); Fan Ouyang, Shenzhen (CN); Xiang Huai Qiu, Shenzhen (CN)

(73) Assignee: Johnson Electric S.A., Murten (CH)

( * ) Notice: Subject to any disclaimer, the term of this patent is extended or adjusted under 35 U.S.C. 154(b) by 148 days.

(21) Appl. No.: 14/816,937

(22) Filed: Aug. 3, 2015

(65) Prior Publication Data
US 2016/0033008 A1 Feb. 4, 2016

(30) Foreign Application Priority Data

Aug. 1, 2014 (CN) .......................... 2014 1 0378522

(51) Int. Cl.
| | | |
|---|---|---|
| *F16H 55/17* | (2006.01) | |
| *F16H 1/16* | (2006.01) | |
| *F16H 57/039* | (2012.01) | |
| *F16H 57/031* | (2012.01) | |

(52) U.S. Cl.
CPC ............. *F16H 1/16* (2013.01); *F16H 57/031* (2013.01); *F16H 57/039* (2013.01)

(58) Field of Classification Search
CPC ........ F16H 57/039; F16H 1/16; F16H 57/031; F16H 57/03; F16H 57/0498; F16H 57/0424
See application file for complete search history.

(56) References Cited

U.S. PATENT DOCUMENTS

| | | | | |
|---|---|---|---|---|
| 5,956,998 A | * | 9/1999 | Fenelon ................. | E05B 81/25 292/144 |
| 8,984,980 B2 | * | 3/2015 | Lam ..................... | F16H 57/048 384/291 |
| 2009/0121568 A1 | * | 5/2009 | Acosta .................... | F16H 1/203 310/77 |
| 2010/0005914 A1 | * | 1/2010 | Strieter ................ | B62D 5/0409 74/388 PS |
| 2010/0275708 A1 | * | 11/2010 | Daniel .................. | F16H 57/022 74/405 |
| 2010/0307273 A1 | * | 12/2010 | Adcock .................. | B60N 2/443 74/434 |
| 2011/0221291 A1 | * | 9/2011 | Mili .......................... | F16H 1/16 310/77 |
| 2016/0169368 A1 | * | 6/2016 | Mao ...................... | F16H 57/039 74/425 |

FOREIGN PATENT DOCUMENTS

| | | | |
|---|---|---|---|
| CN | 1105930 A | 8/1995 | |
| JP | 2001-65666 A | 3/2001 | |
| JP | 2007-146967 A | 6/2007 | |
| WO | WO 2012131595 A1 * | 10/2012 | ............... F16H 1/16 |

* cited by examiner

*Primary Examiner* — Zakaria Elahmadi
(74) *Attorney, Agent, or Firm* — Muncy, Geissler, Olds & Lowe, P.C.

(57) ABSTRACT

A gearbox includes a main housing, a cover, a worm wheel and an output shaft. The main housing includes a receiving chamber having a bottom and a hub. The cover is mounted to an opening of the receiving chamber. The worm wheel is mounted in the receiving chamber. The output shaft is mounted to a center of the worm wheel and coaxially rotatable with the worm wheel. The output shaft extends outwardly through the hub from the receiving chamber. The hub directly supports either the worm wheel or the output shaft.

12 Claims, 13 Drawing Sheets

GEARBOX

CROSS REFERENCE TO RELATED APPLICATIONS

This non-provisional patent application claims priority under 35 U.S.C. §119(a) from Patent Application No. 201410378522.5, filed in The People's Republic of China on Aug. 1, 2014, the entire contents of which are hereby incorporated by reference.

FIELD OF THE INVENTION

This invention relates to an actuator and in particular, to a gearbox having a worm wheel.

BACKGROUND OF THE INVENTION

A typical gearbox includes a main housing having a hub, a rotary shaft mounted to the hub via a bushing, a worm wheel mounted in the main housing and fixed to the rotary shaft, an output gear located outside the main housing and fixed to the rotary shaft. Once the worm wheel is driven, a rubber gasket, a driving plate, the rotary shaft and the output gear are driven to rotate coaxially. The worm wheel, rubber gasket, driving plate, rotary shaft, and output gear typically all have complicated structures and are connected in a complex manner.

SUMMARY OF THE INVENTION

Hence there is a desire for a gearbox having a simplified structure with a lesser number of parts while passing the reliability test.

The present invention provides a gearbox including a main housing, a cover, a worm wheel and an output shaft. The main housing includes a worm wheel receiving chamber and a hub at a center of a bottom of the receiving chamber. The cover is mounted to an opening of the receiving chamber. The worm wheel is mounted in the receiving chamber. The output shaft is mounted to a center of the worm wheel and coaxially rotatable along with the worm wheel. The output shaft extends outwardly through the hub via the receiving chamber, and the hub directly supports one of the worm wheel or the output shaft.

Preferably, the worm wheel after assembled is movable within a predetermined distance in the receiving chamber along an axial direction of the output shaft, and a surface of the cover facing the worm wheel comprises limiting blocks for limiting a minimum distance between the worm wheel and the cover.

Preferably, a near-worm-wheel end of the output shaft is tenoned with the worm wheel along the axial direction of the output shaft, and the output shaft is supported by the hub.

Preferably, the near-worm-wheel end of the output shaft comprises a projecting limiting ring for limiting a depth of the near-worm-wheel end inserted into the worm wheel along the axial direction of the output shaft.

Preferably, the worm wheel comprises a limiting step for supporting the limiting ring.

Preferably, the worm wheel comprises an annular body with teeth and a connecting plate connected to an inner surface of the annular body. A center of the connecting plate is raised toward the cover to form a boss, with a blind hole formed at a side opposite to the boss. The location of the limiting blocks correspond to the annular body and/or the boss, and the near-worm-wheel end of the output shaft is fixedly received in the blind hole.

Preferably, an annular groove is formed in one of an outer circumferential surface of the output shaft and an inner surface of the hub, a sealing ring is mounted in the annular groove, and the sealing ring is sandwiched between the hub and the output shaft.

Preferably, the output shaft integrally forms an output gear, such that the output gear is coaxially rotatable along with the output shaft.

Preferably, the worm wheel comprises an annular body with teeth and a connecting plate connected to an inner surface of the annular body, a center of a side of the connecting plate away from the cover comprises a hollow cylinder, the output shaft is axially tenoned into the hollow cylinder, and the hollow cylinder is supported by the hub.

Preferably, a near-worm-wheel end of the output shaft passes through a bottom of the hollow cylinder, and the near-worm-wheel end of the output shaft passing through the bottom of the hollow cylinder is formed with an annular groove, and a limiting ring is received in the annular groove for preventing the output shaft from becoming disengaged from the worm wheel.

Preferably, the output shaft integrally forms a coaxial output gear, and a near-worm-wheel end of the output gear is inserted into the hollow cylinder.

Preferably, an annular groove is formed at a junction of the hollow cylinder and the connecting plate, a sealing ring is mounted in the annular groove, and the sealing ring is sandwiched between the hub and the junction.

Preferably, the worm wheel comprises an annular body with teeth and a connecting plate connected to an inner surface of the annular body, a center of a side of the connecting plate away from the cover comprises a hollow cylinder and a boss disposed in the hollow cylinder, a radial gap is formed between the hollow cylinder and the boss, the near-worm-wheel end of the output shaft is hollow and inserted into the gap, and the hollow cylinder is supported by the hub.

Preferably, an outer circumferential surface of the output shaft comprises an annular locking groove, an inward flange is formed at an opening of the hollow cylinder, and the inward flange engages with the locking groove for preventing the output shaft from becoming disengaged from the worm wheel.

Preferably, the limiting blocks of the cover comprise multiple sector-shaped blocks or triangular blocks arranged in a circle.

In view of the foregoing, the above embodiments can simplify the structure of the gearbox, reduces the number of the parts and make the gearbox easier to assemble. Keeping the worm wheel and the output shaft as two separate items allows these two parts to be made of different materials.

BRIEF DESCRIPTION OF THE DRAWINGS

A preferred embodiment of the invention will now be described, by way of example only, with reference to figures of the accompanying drawings. In the figures, identical structures, elements or parts that appear in more than one figure are generally labeled with a same reference numeral in all the figures in which they appear. Dimensions of components and features shown in the figures are generally chosen for convenience and clarity of presentation and are not necessarily shown to scale. The figures are listed below.

DETAILED DESCRIPTION OF THE PREFERRED EMBODIMENTS

Referring to FIG. 1 to FIG. 4, a gearbox 50 in accordance with one embodiment of the present invention includes a main housing 52, a cover 53, a worm wheel 81, and an output shaft 71. The main housing 52 defines a receiving chamber 61 for receiving the worm wheel 81. One end of the output shaft 71 is coaxially connected to the worm wheel, and the other end passes through a hub 65 formed on a bottom 63 of the receiving chamber 61. The hub 65 directly supports the output shaft 71, such that the output shaft 71 and the worm wheel 81 can rotate relative to the hub 65. A plurality of reinforcing ribs 69 is formed at a junction of the hub 65 and the bottom 63. The reinforcing ribs 69 surround the hub 65 and are uniformly arranged on an outer circumference of the hub 65. The reinforcing ribs 69 interconnect an outer circumferential surface of the hub 65 and a surface of the bottom 63 for reinforcing the hub 65. The cover 53 is mounted to an opening of the receiving chamber 61. For facilitating mounting the cover 53, the main housing 52 forms a limiting recessed edge 64 at the opening of the receiving chamber 61. In use, the gearbox is connected to a motor. A motor shaft having a worm enters the main housing 52 via an opening 57 of the main housing 52, and the worm meshes with the worm wheel 81.

Figure 1:
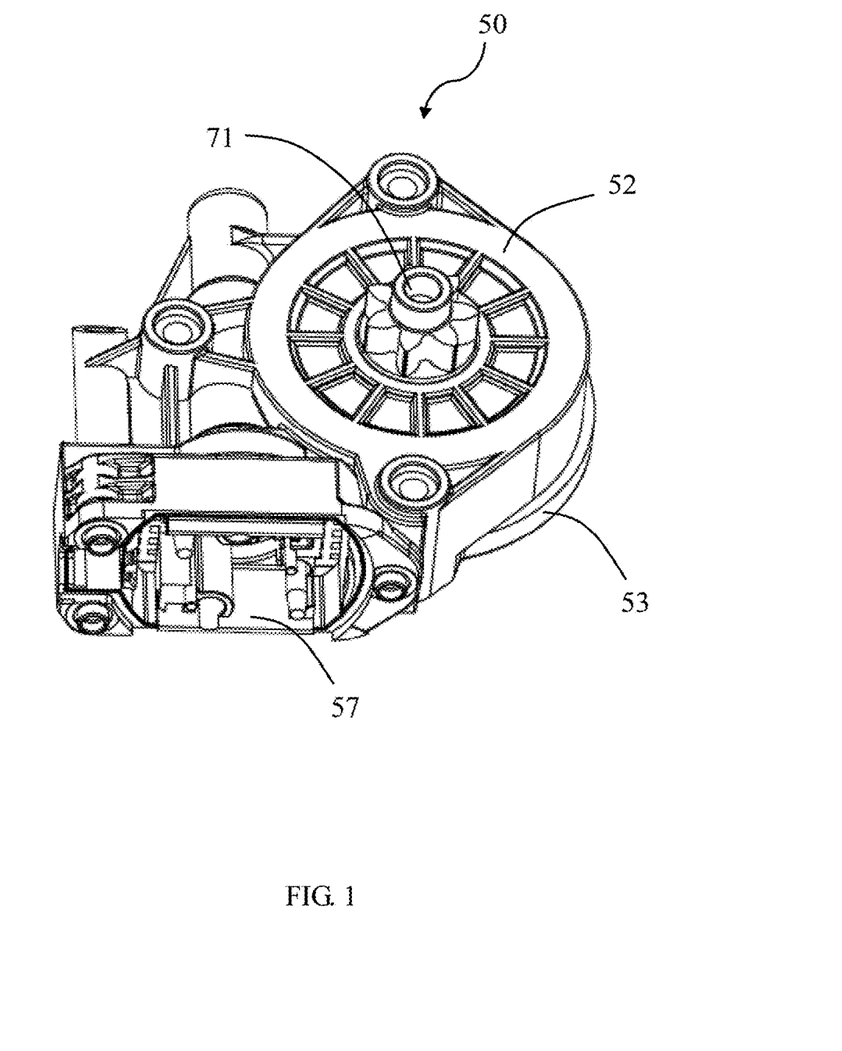
FIG. 1 is a perspective view of a gearbox according to one embodiment.
Figure 2:
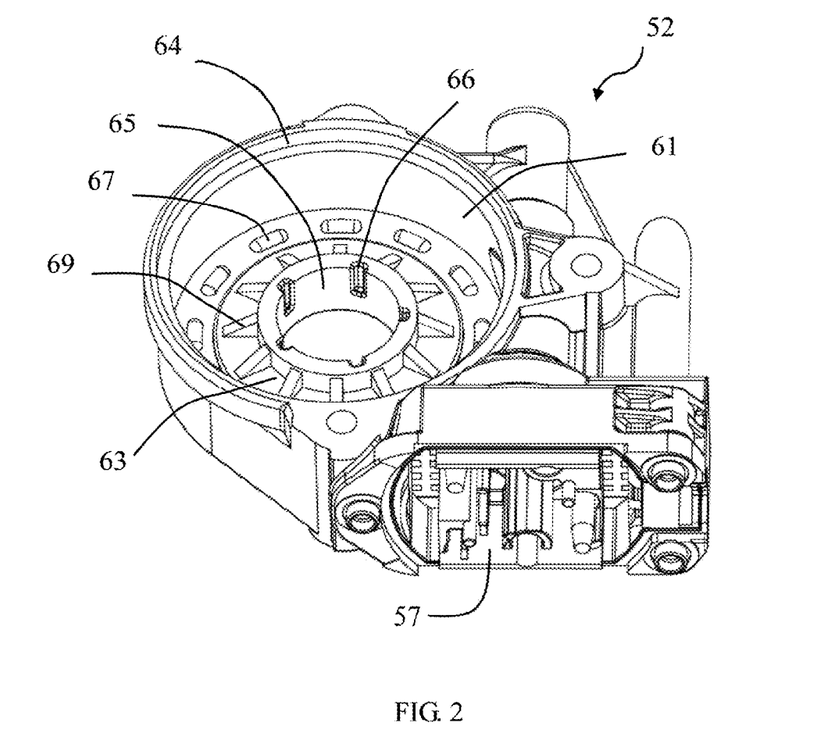
FIG. 2 illustrates a main housing of the gearbox of FIG. 1.

As shown in FIG. 2, a plurality of axial recesses 66 is formed in an inner surface of the hub 65, for storage of lubrication oil. In addition, after the plastic gear is worn, the wear debris can be left in the recesses 66 to prevent the wear debris from affecting rotation of the gear.

Referring to FIG. 4 to FIG. 7, the output shaft 71 includes a shaft body 72. A near-worm-wheel end (i.e. the end of the output shaft 71 adjacent the worm wheel 81) of the shaft body 72 is tenoned with the worm wheel 81. In the present embodiment, the worm wheel 81 includes an annular body 84 and a connecting plate 82 connected to an inner surface of the annular body 84, and an outer circumference of the annular body 84 is formed with teeth. Preferably, the connecting plate 82 extends inwardly from an axial center area of the inner surface of the annular body 84. The near-worm-wheel end of the output shaft 71 includes a plurality of tenons 78 circumferentially spaced from each other and extending radially. Correspondingly, the connecting plate 82 of the worm wheel 81 defines a recessed receiving hole 83a at a center thereof. An inner surface of the receiving hole 83a forms a plurality of mortises 88 for receiving the tenons 78 in an interference-fit manner. When the output shaft 71 is axially inserted into the receiving hole of the worm wheel 81, the tenons 78 are engaged with the mortises 88, thus fixedly mounting the output shaft 71 to the worm wheel 81. An end of the output shaft 71 remote from the worm wheel integrally forms an output gear 76. The output gear 76 rotates coaxially with the output shaft.

Preferably, the near-worm-wheel end of the output shaft 71 further includes a projecting limiting ring 79 for limiting the depth of the output shaft 71 inserted into the worm wheel 81, thereby preventing the output shaft 71 from axially penetrating through the worm wheel 81.

Preferably, the worm wheel 81 forms a limiting step 89 at the receiving hole 83a for supporting the limiting ring 79.

Referring to FIG. 3 through FIG. 9, a surface of the cover 53 facing the worm wheel 81 forms a plurality of limiting blocks 54 arranged in a circle. The location of the limiting blocks 54 corresponds to the annular body 84 of the worm wheel 81 to limiting a minimum distance between the worm wheel 81 and the cover 53, thereby limiting an axial movement distance of the output shaft 71 relative to the hub 65. The limiting blocks 54 also reduce the friction between the cover 53 and the worm wheel 81. Correspondingly, an inner surface of the bottom 63 of the receiving chamber 61 also forms a plurality of limiting blocks 67. The limiting blocks 67 of the bottom 63 engages with the annular body 84, for limiting a minimum distance between the worm wheel 81 and the bottom 63. Limiting blocks 67 also reduce the friction between the worm wheel 81 and the bottom 63 of the receiving chamber 61.

Figure 7:
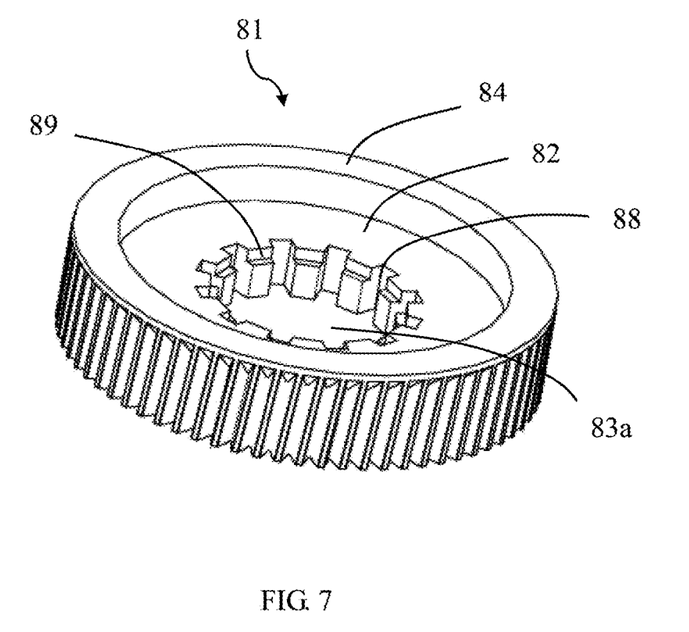
FIG. 7 illustrates the worm wheel of FIG. 4.
Figure 8:
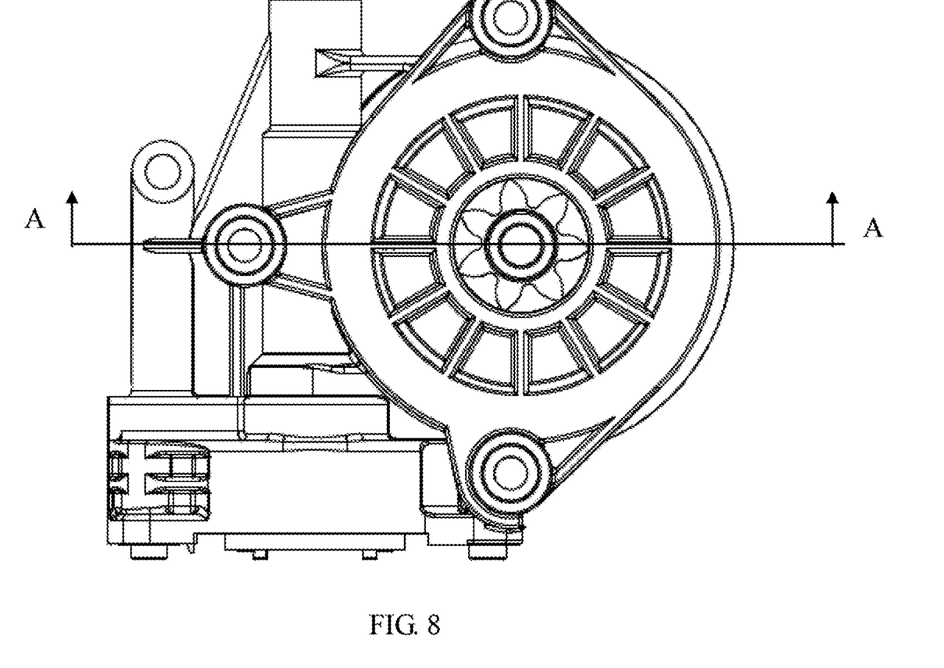
FIG. 8 is a plan view of the gearbox of FIG. 1.

In the present embodiment, the receiving hole 83a of the connecting plate 82 is a blind hole, which is formed at the center of the connecting plate 82 recessed in a direction away from the output shaft 71. As a result, a boss 83b is formed at the center aligned with the receiving hole 83a, which is raised toward the cover 53. This can increase the contact area between the output shaft 71 and the worm wheel 81 and the strength of the connecting plate 82. Therefore, the worm wheel 81 can withstand and transmit a larger driving force.

Figure 3:
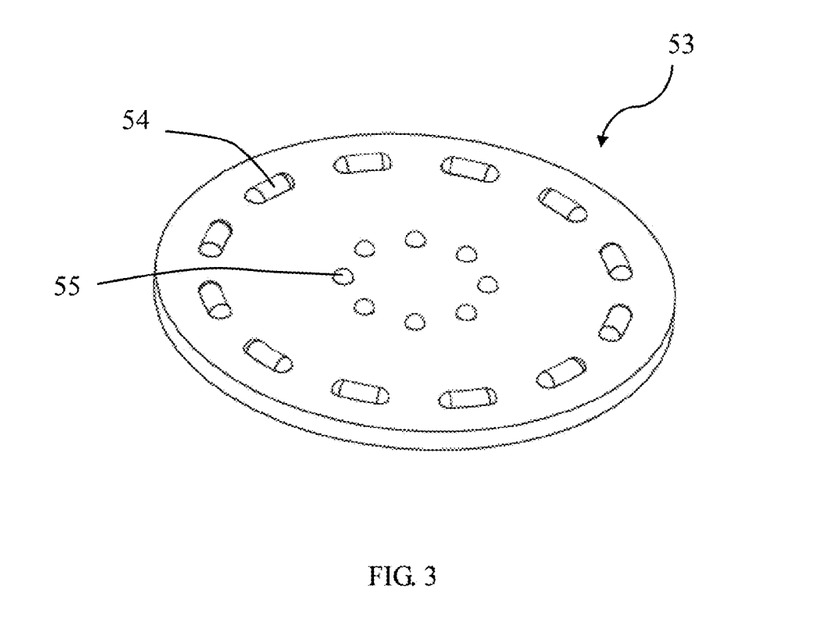
FIG. 3 illustrates a cover of the gearbox of FIG. 1.
Figure 4:
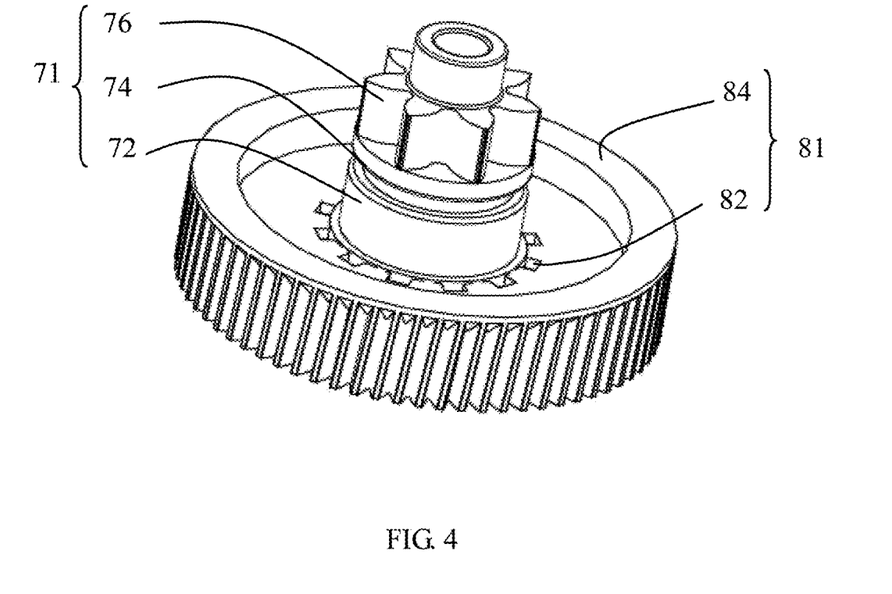
FIG. 4 and FIG. 5 are assembled views of the worm wheel and the output shaft of the gearbox of FIG. 1.
Figure 5:
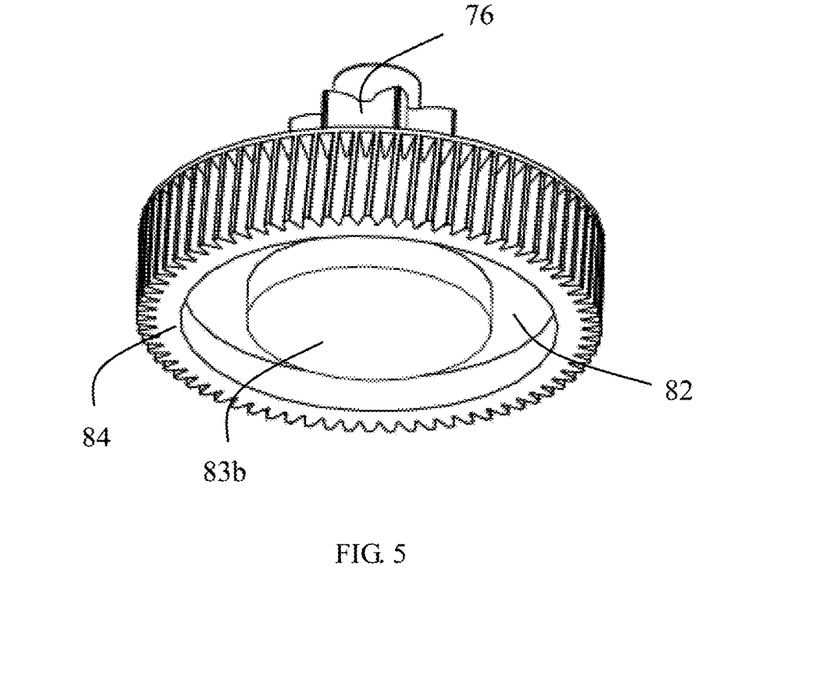
Figure 6:
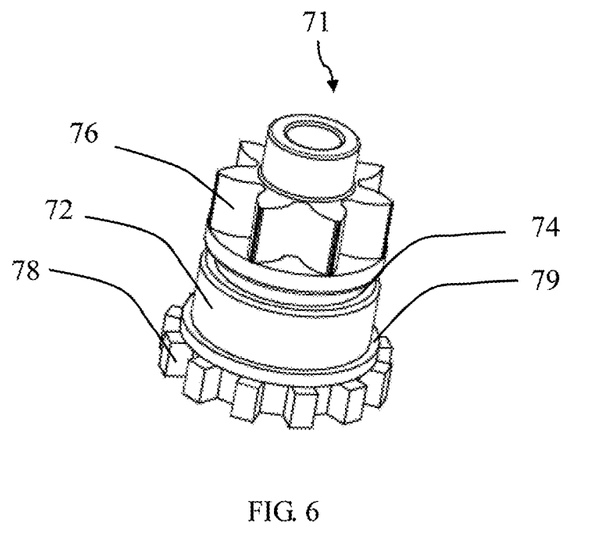
FIG. 6 illustrates the output shaft of FIG. 4.

Further, a center of the cover 53 further includes limiting blocks 55 corresponding to the boss 83b. The limiting blocks 54, 55 engage with the annular body 84 and boss 83b of the worm wheel 81, respectively, to limit a minimum distance between the worm wheel 81 and the cover 53. In this embodiment, the limiting blocks 54 are rounded oblong protrusions, and the limiting blocks 55 are hemispheric protrusions. It should be noted that the limiting blocks 54, 55 can have another shape other than the oblong or hemispheric shape. Preferably, the limiting blocks 54, 55 have the same height, i.e. the surface of the annular body 84 of the worm wheel 81 that engages the limiting blocks 54 is flush with the surface of the boss 83b that engages the limiting blocks 55. In another embodiment, the limiting blocks 54, 55 may have different heights.

Figure 9:
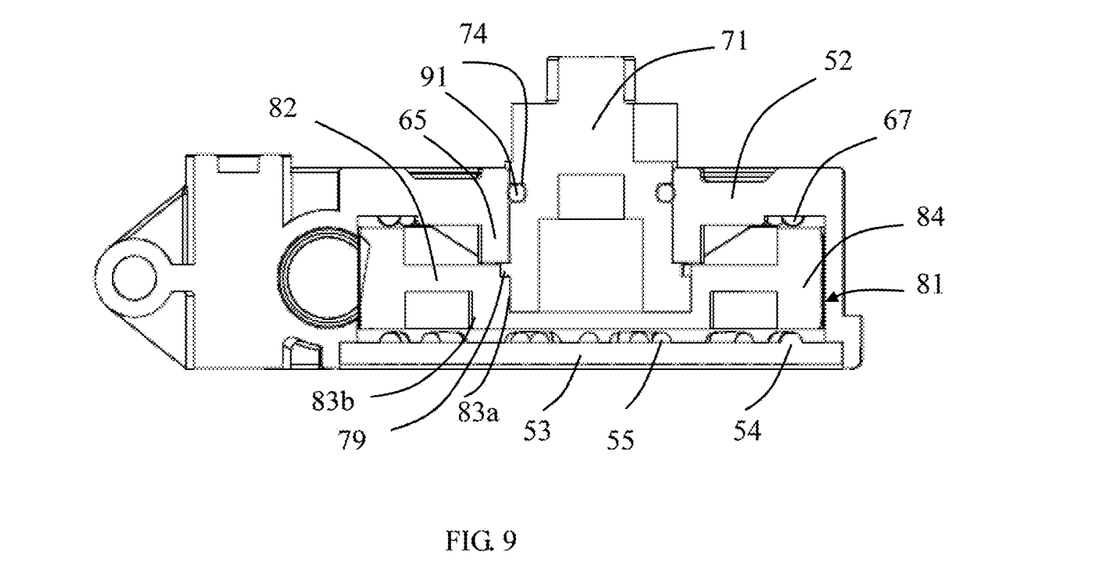
FIG. 9 is a sectional view of the gearbox of FIG. 8.
Figure 10:
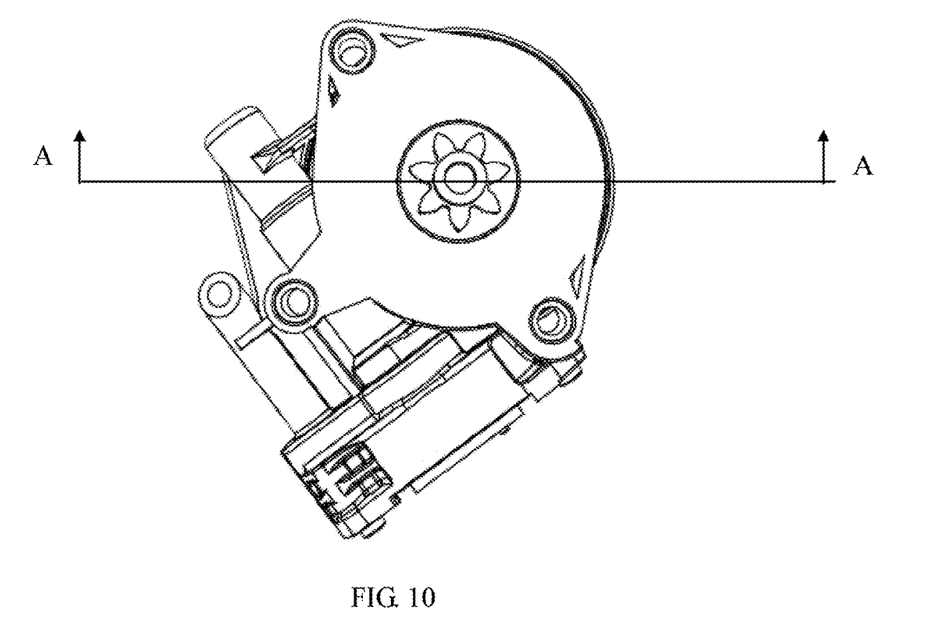
FIG. 10 is a plan view of a gearbox according to a second embodiment.

In addition, an annular groove 74 is formed in an outer circumferential surface of the output shaft 71, and a sealing ring 91 is mounted in the annular groove 74. As shown in FIG. 9, the sealing ring 91 is sandwiched between the hub 65 and the output shaft 71 for sealing, waterproofing and anti-leakage function.

In the first embodiment, the gear of the gearbox includes two parts, i.e. the worm wheel 81 and the output shaft 71 having the output gear 76. Therefore, the gear of the gearbox has a simplified and compact structure. The gearbox includes five parts, i.e. the main housing 52, the cover 53, the worm wheel 81, the sealing ring 91, and the output shaft 71, which are easy to assemble. The present gearbox reduces the number of the parts and cost while passing the reliability test.

Referring to FIG. 10 through FIG. 17, a gearbox of a second embodiment differs from the gearbox of the first embodiment mainly in the cover 53, output shaft 71 and the worm wheel 81.

The worm wheel 81 includes an annular body 84 and a connecting plate 82 connected to an inner surface of the annular body 84, and an outer circumference of the annular body 84 is formed with teeth. A center of a side of the connecting plate 82 adjacent the output shaft 71 includes a hollow cylinder 83c. The cylinder 83c has a concave-convex inner surface defining a mortise 88. An outer circumference of the output shaft 71 integrally forms an output gear 76. When the near-worm-wheel end of the output gear 76 is axially inserted into the hollow cylinder 83c, teeth of the output gear 76 are interference-fit with the mortise 88, thus fixedly mounting the output gear 76 to the worm wheel 81. The other end of the output gear 76 extends out of the hollow cylinder for torque transfer. The hollow cylinder 83c extends through the hub 65 from the receiving chamber 61 and is directly supported by the hub 65.

The near-worm-wheel end 73 of the output shaft 71 further extends through the bottom of the hollow cylinder 83c (i.e. extends through the connecting plate 82). After the near-worm-wheel end 73 extends through the bottom of the hollow cylinder 83c, the limiting ring 79 is mounted to the near-worm-wheel end 73 to prevent the output shaft 71 from becoming disengaged from the worm wheel 81. In the present embodiment, the outer circumferential surface of the near-worm-wheel end 73 is provided with a radially inwardly recessed limiting groove for receiving the limiting ring 79, and the limiting ring 79 is a resilient C-shaped ring. After the limiting ring 79 is assembled, the connecting plate 82 is sandwiched between the limiting ring 79 and the output gear 76.

A side of the connecting plate 82 remote from the output shaft 71 is further provided with projecting hollow cylinder 83d. The hollow cylinder 83d surrounds the near-worm-wheel end 73 of the output shaft 71. Preferably, the hollow cylinder 83d and the hollow cylinder 83c are aligned with each other and have substantially the same outer diameter. The hollow cylinder 83d acts to reinforce the connecting plate 82. Similarly, the main housing 52 includes limiting blocks 67 for limiting the minimum distance between the worm wheel 81 and the bottom plate, and the cover 53 includes limiting blocks 54 for limiting the minimum distance between the worm wheel 81 and the cover 53. The limiting blocks 67 are aligned with the annular body 84 of the worm wheel 81.

Figure 13:
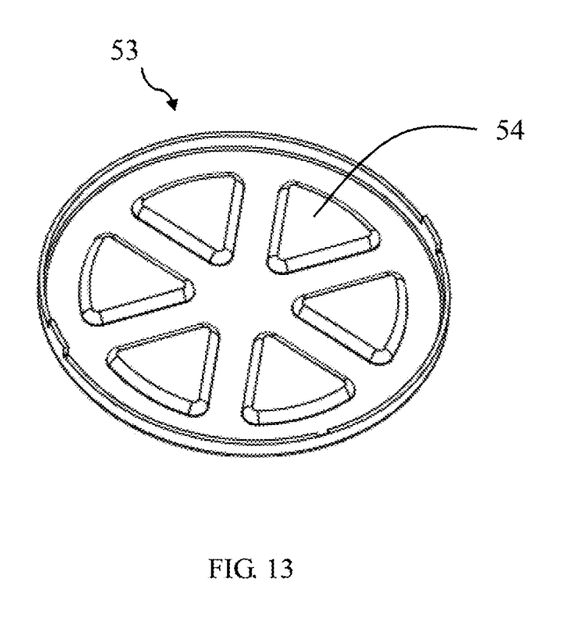
FIG. 13 illustrates the cover of the gearbox of FIG. 10.
Figure 14:
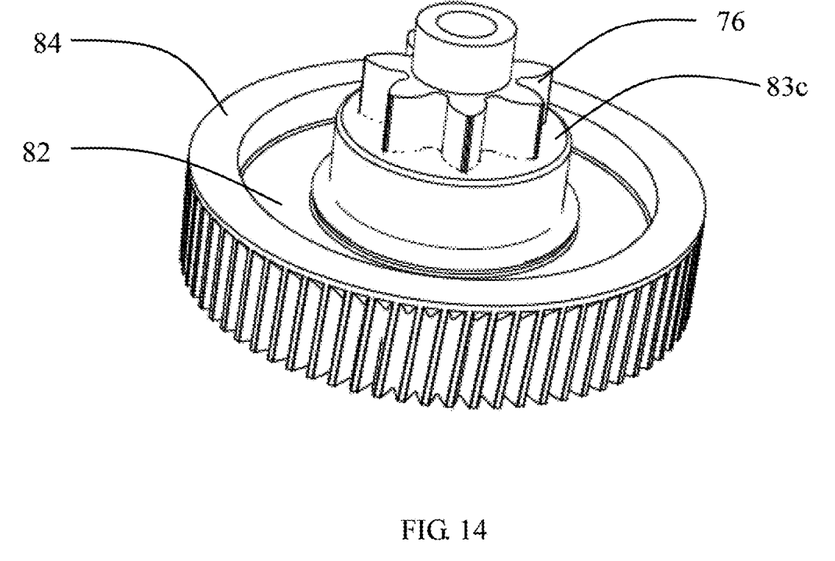
FIG. 14 and FIG. 15 are assembled views of the worm wheel and the output shaft of the gearbox of FIG. 10.
Figure 15:
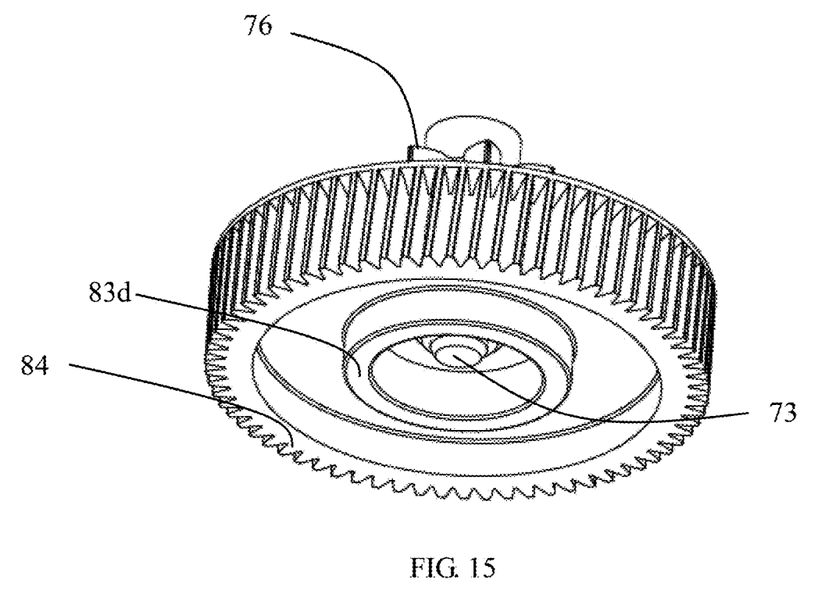
Figure 16:
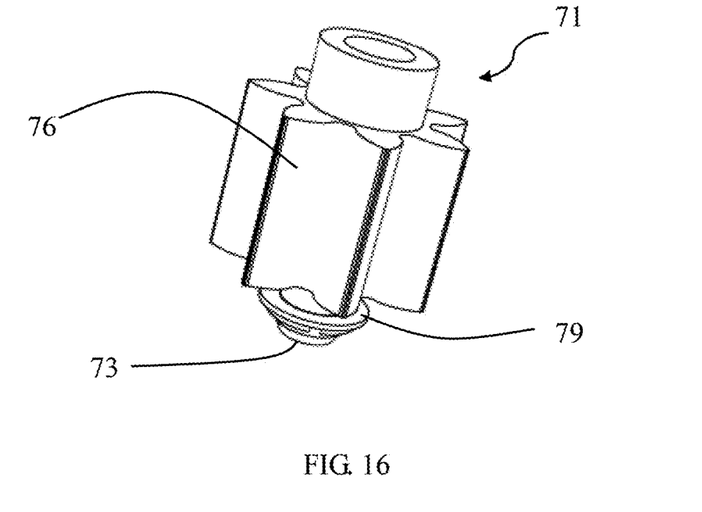
FIG. 16 illustrates the output shaft of FIG. 14.
Figure 17:
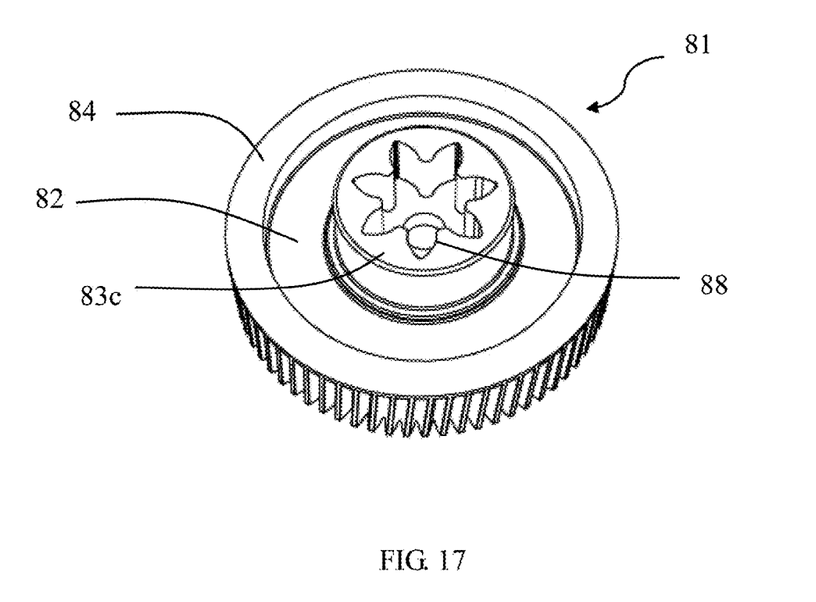
FIG. 17 illustrates the worm wheel of FIG. 14.
Figure 18:
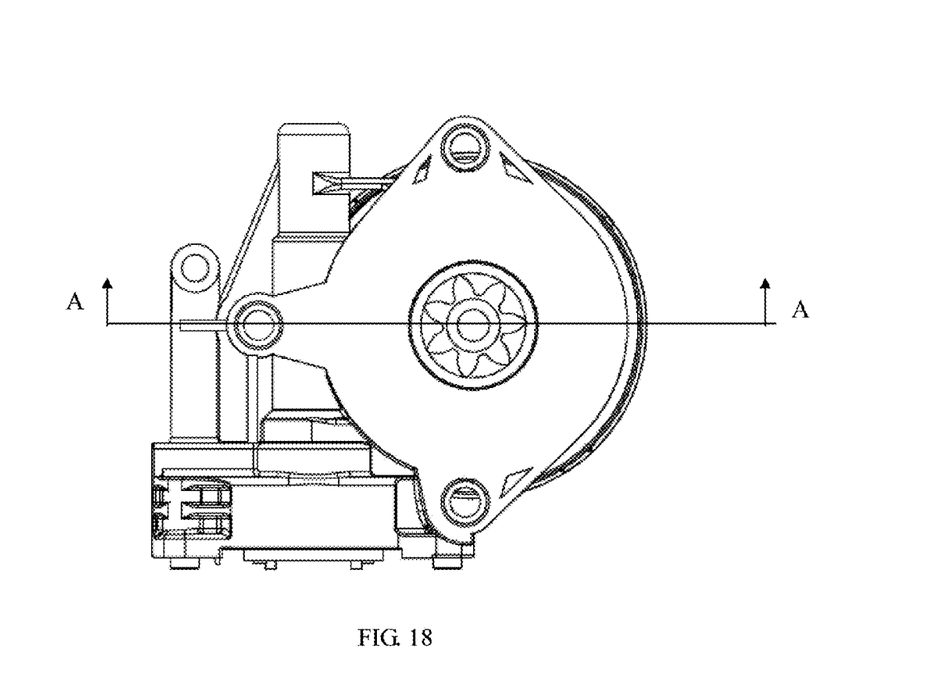
FIG. 18 is a plan view of a gearbox according to a third embodiment.

Preferably, the limiting blocks 54 of the cover 53 include multiple sector-shaped blocks or triangular blocks arranged in a circle. Each sector-shaped block or triangular block engages with both of the annular body 84 and the hollow cylinder 83d.

Figure 11:
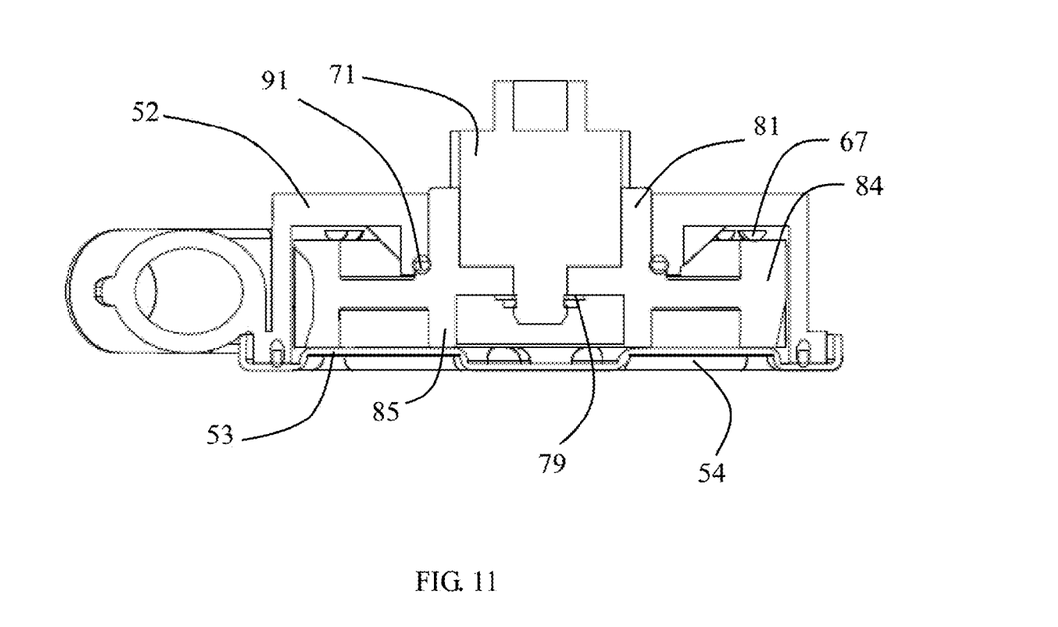
FIG. 11 is a sectional view of the gearbox of FIG. 10.
Figure 12:
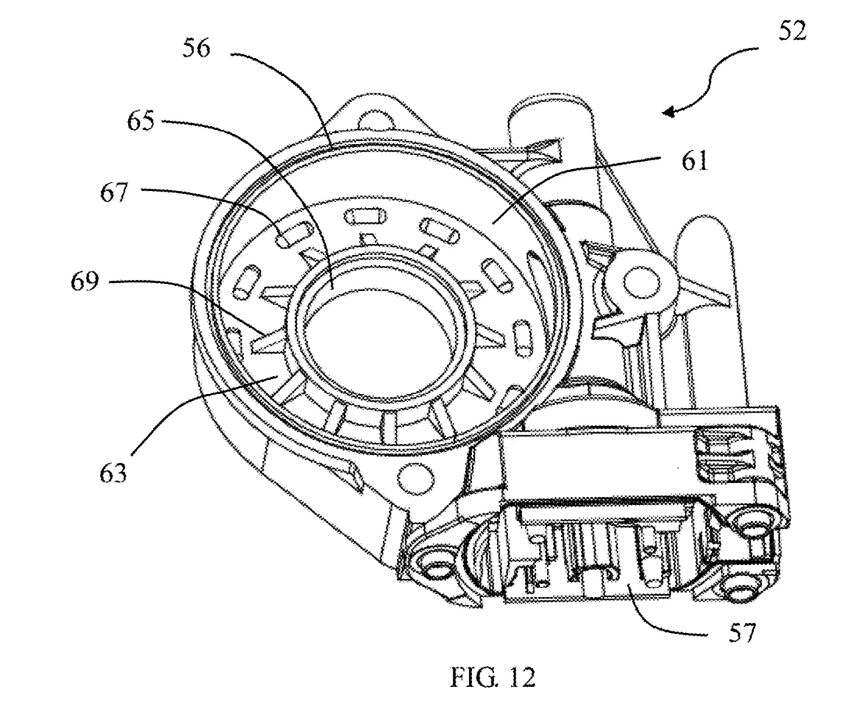
FIG. 12 illustrates the main housing of the gearbox of FIG. 10.

In addition, an annular groove is formed at a junction of the outer circumferential surface of the hollow cylinder 83c and the connecting plate 82, for receiving a sealing ring 91 therein. The sealing ring 91 is sandwiched between the hub 65 and the worm wheel 81.

The gear of the gearbox of the second embodiment of the present invention includes the worm wheel 81, the output shaft 71 having the output gear 76, and the limiting ring 79 for preventing separating of the output shaft 71 from the worm wheel 81. The gearbox of the second embodiment reduces the number of the parts and cost while passing the reliability test.

Referring to FIG. 18 through FIG. 24, a gearbox of a third embodiment differs from the gearbox of the second embodiment mainly in the output shaft 71 and the worm wheel 81. The worm wheel 81 includes an annular body 84 and a connecting plate 82 connected to an inner surface of the annular body 84, and an outer circumference of the annular body 84 is formed with teeth. A center of a side of the connecting plate 82 remote from the cover includes a hollow cylinder 83c and a boss 83e (FIG. 24) in the hollow cylinder 83c. Preferably, the hollow cylinder 83c and the boss 83e are coaxial, with a radial gap formed there between. The cylinder 83c has a concave-convex inner surface defining mortises 88, for supporting the output shaft 71. Correspondingly, an outer circumference of the near-worm-wheel end of the output shaft 71 forms tenons 78 for engaging the mortises 88. The tenons 78 form a cylinder which is hollow to receive the boss 83e. As such, the output shaft 71 is mounted to the worm wheel 81 by axially inserting the near-worm-wheel end of the output shaft 71 into the worm wheel 81. Once connected, the near-worm-wheel end of the output shaft 71 is sandwiched between the boss 83e and the hollow cylinder 83c.

Preferably, an inward flange 85 (FIG. 19) is formed at the opening of the hollow cylinder 83c, a locking groove 75 (FIG. 23) is formed on an outer circumferential surface of the output shaft 71, and the inward flange 85 engages in the locking groove 75 to prevent the output shaft 71 from becoming disengaged from the worm wheel 81. Preferably, the worm wheel 81 is directly formed on the output shaft 71 in an over-mold process.

Figure 21:
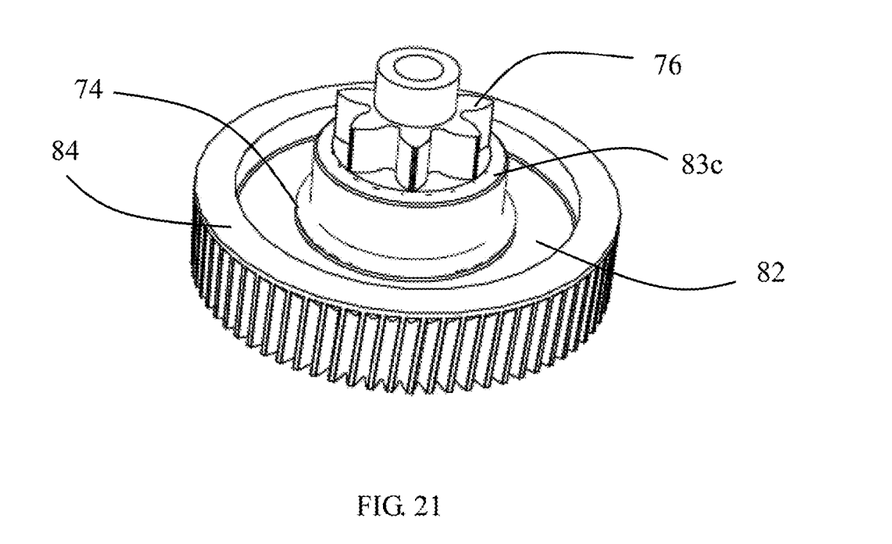
FIG. 21 and FIG. 22 are assembled views of the worm wheel and the output shaft of the gearbox of FIG. 18.
Figure 22:
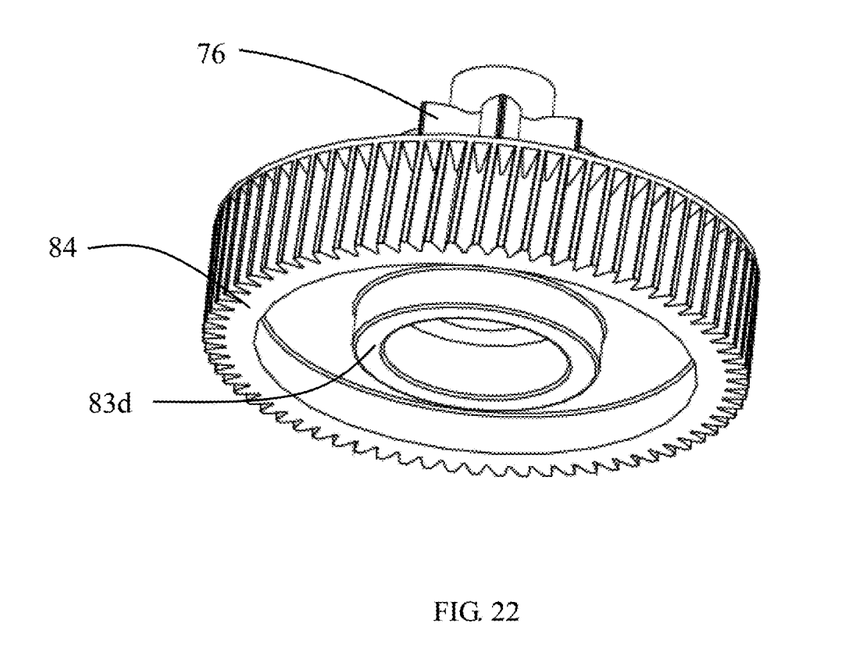
Figure 23:
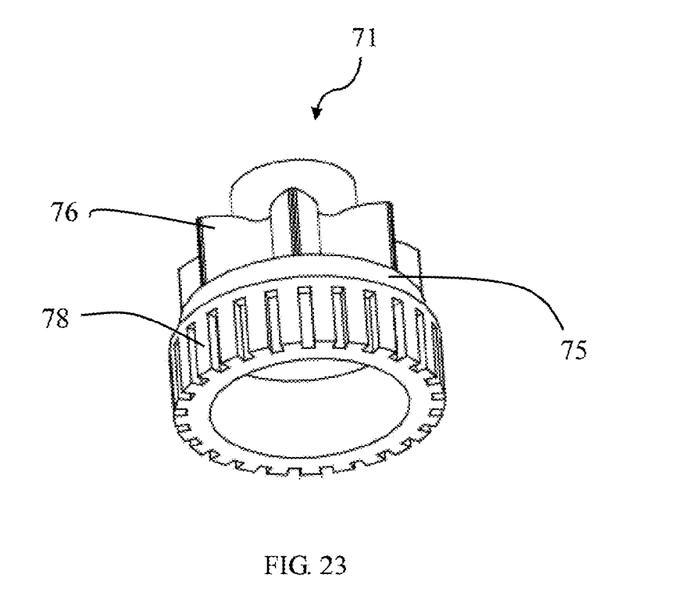
FIG. 23 illustrates the output shaft of FIG. 21.
Figure 24:
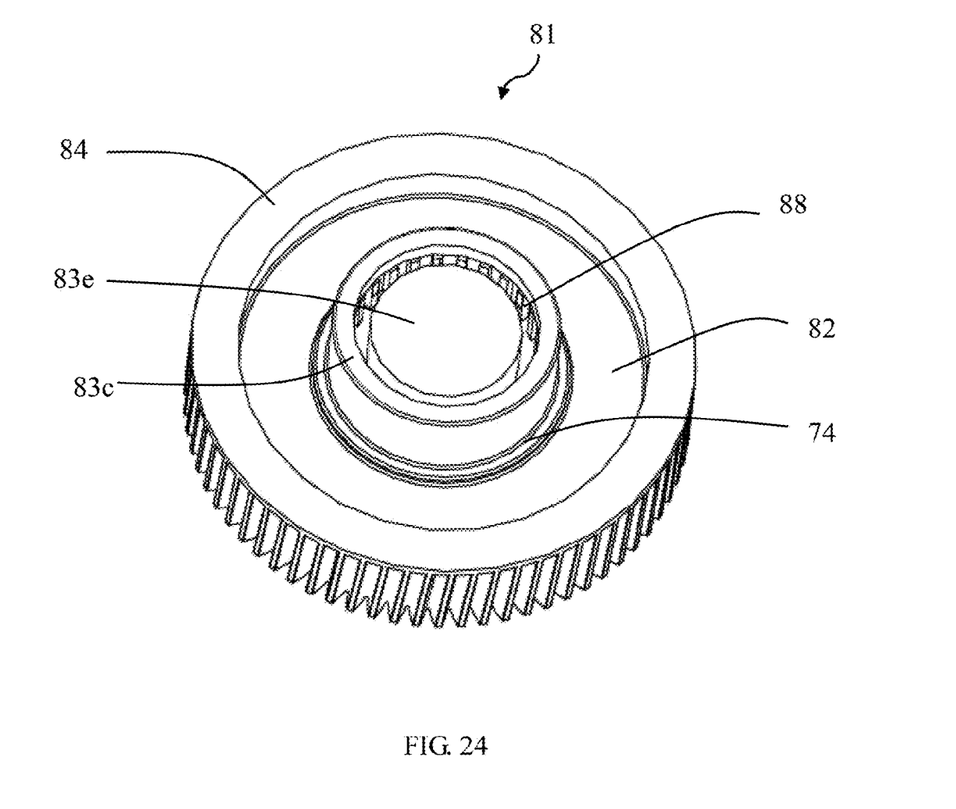
FIG. 24 illustrates the worm wheel of FIG. 21.

A side of the connecting plate 82 away from the output shaft 71 further forms a projecting hollow cylinder 83d. Preferably, the hollow cylinder 83d and the hollow cylinder 83c are aligned with each other and have substantially the same output diameter. The hollow cylinder 83d acts to reinforce the connecting plate 82.

Figure 19:
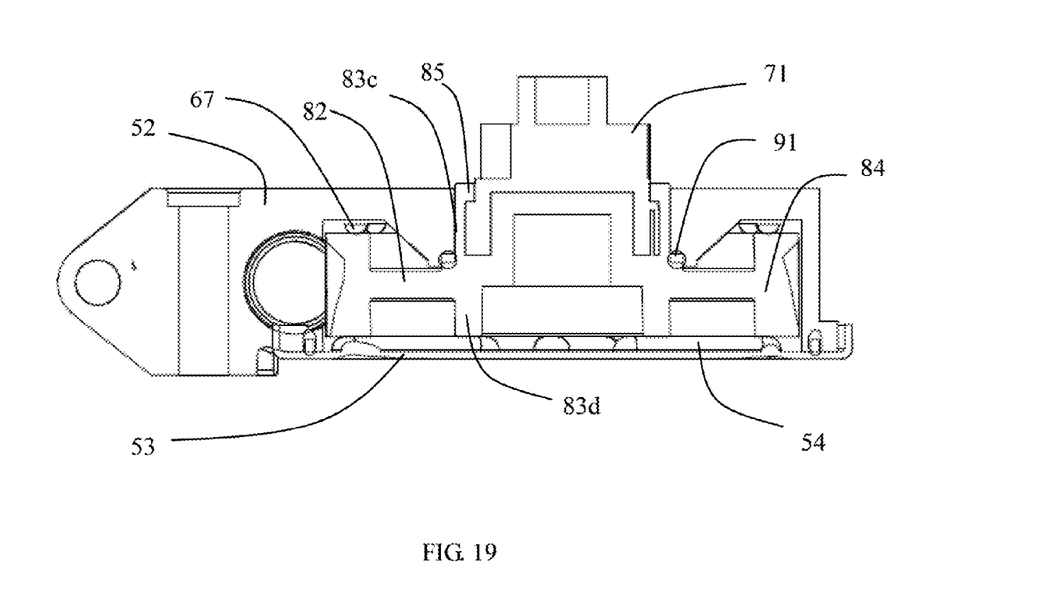
FIG. 19 is a sectional view of the gearbox of FIG. 18.
Figure 20:
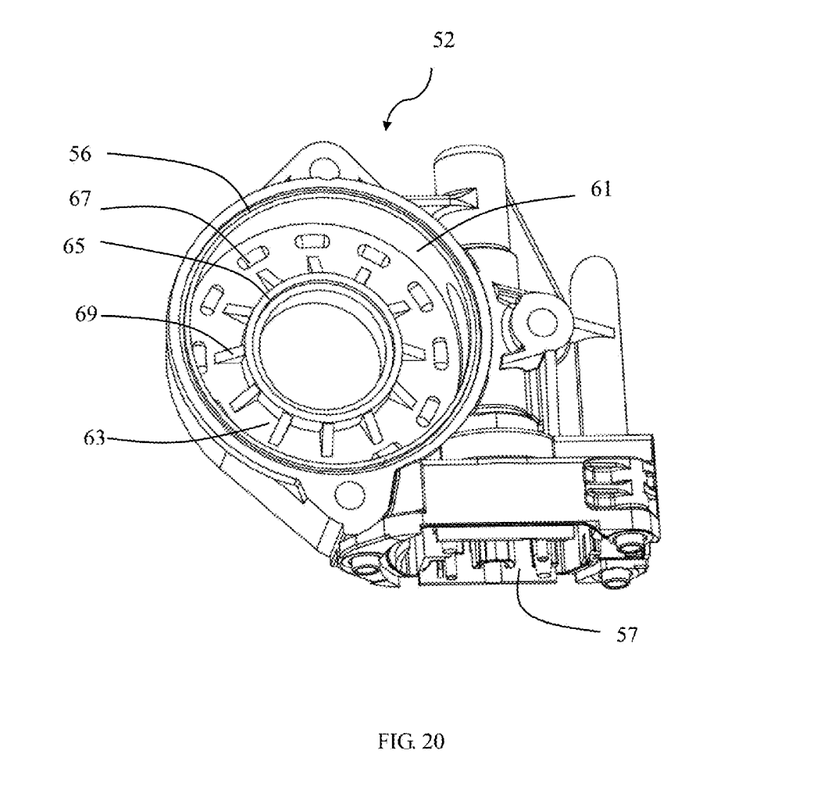
FIG. 20 illustrates the main housing of the gearbox of FIG. 18.

In the present embodiment, the hollow cylinder 83c of the worm wheel 81 passes through the hub 65 of the main housing 52 and is directly supported by the hub 65, such that the output shaft 71 and the worm wheel 81 is rotatable relative to the hub 65. Similarly, the main housing 52 includes limiting blocks 67 for limiting the minimum distance between the worm wheel 81 and the bottom plate, and the cover 53 includes limiting blocks 54 for limiting the minimum distance between the worm wheel 81 and the cover 53. The limiting blocks 67 are aligned with the annular body 84 of the worm wheel 81. Preferably, the limiting blocks 54 of the cover 53 include multiple sector-shaped blocks or triangular blocks arranged in a circle. Each sector-shaped block or triangular block engages with both of the annular body 84 and the hollow cylinder 83d.

In the third embodiment, the gear of the gearbox includes the worm wheel 81 and the output shaft 71 having the output gear 76. Therefore, the gear of the gearbox of the third embodiment has a simplified and compact structure and is easy to assemble. The gearbox of the third embodiment reduces the number of the parts and cost while passing the reliability test.

Although the invention is described with reference to one or more preferred embodiments, it should be appreciated by those skilled in the art that various modifications are possible. For instance, the output gear may be separately formed and then assembled to the output shaft without departing from the spirit of the present invention. Therefore, the scope of the invention is to be determined by reference to the claims that follow.

In the description and claims of the present application, each of the verbs "comprise", "include", "contain" and "have", and variations thereof, are used in an inclusive sense, to specify the presence of the stated item or feature but do not preclude the presence of additional items or features.

It is appreciated that certain features of the invention, which are, for clarity, described in the context of separate embodiments, may also be provided in combination in a single embodiment. Conversely, various features of the invention which are, for brevity, described in the context of a single embodiment, may also be provided separately or in any suitable sub-combination.

The invention claimed is:

1. A gearbox comprising:
a main housing comprising a receiving chamber for receiving a worm wheel and a hub at a center of a bottom of the receiving chamber;
a cover mounted to an opening of the receiving chamber,
a worm wheel mounted in the receiving chamber, and
an output shaft mounted to a center of the worm wheel and coaxially rotatable with the worm wheel,
wherein the output shaft extends outwardly through the hub via the receiving chamber, and the hub directly supports one of the worm wheel and the output shaft,
wherein the worm wheel after assembled is movable within a predetermined distance in the receiving chamber in an axial direction of the output shaft, a surface of the cover facing the worm wheel comprises limiting blocks for limiting a minimum distance between the worm wheel and the cover, and
wherein the worm wheel comprises an annular body with teeth and a connecting plate connected to an inner surface of the annular body, a center of the connecting plate is raised toward the cover to form a boss, with a blind hole formed at a side opposite to the boss, the location of the limiting blocks correspond to the annular body and/or the boss, and an end of the output shaft is fixedly received in the blind hole.

2. The gearbox of claim 1, wherein a first end of the output shaft adjacent the worm wheel is tenoned with the worm wheel along the axial direction of the output shaft, and the output shaft is supported by the hub.

3. The gearbox of claim 2, wherein the first end of the output shaft comprises a projecting limiting ring for limiting a depth of the first end inserted into the worm wheel.

4. The gearbox of claim 3, wherein the worm wheel comprises a limiting step for supporting the limiting ring.

5. The gearbox of claim 1, wherein an annular groove is formed in one of an outer circumferential surface of the output shaft and an inner surface of the hub, a sealing ring is mounted in the annular groove, and the sealing ring is sandwiched between the hub and the output shaft.

6. The gearbox of claim 1, wherein the output shaft integrally forms an output gear, such that the output gear is coaxially rotatable with the output shaft.

7. A gearbox comprising:
a main housing comprising a receiving chamber for receiving a worm wheel and a hub at a center of a bottom of the receiving chamber;
a cover mounted to an opening of the receiving chamber,
a worm wheel mounted in the receiving chamber, and
an output shaft mounted to a center of the worm wheel and coaxially rotatable with the worm wheel,
wherein the output shaft extends outwardly through the hub via the receiving chamber, and the hub directly supports one of the worm wheel and the output shaft,
wherein the worm wheel comprises an annular body with teeth and a connecting plate connected to an inner surface of the annular body, a center of a side of the connecting plate remote from the cover comprises a hollow cylinder, the output shaft is axially tenoned into the hollow cylinder, and the hollow cylinder is supported by the hub, and
wherein a first end of the output shaft adjacent the worm wheel passes through a bottom of the hollow cylinder, and the first end of the output shaft is formed with an annular groove, and a limiting ring is received in the annular groove for preventing the output shaft from becoming disengaged from the worm wheel.

8. The gearbox of claim 7, wherein the output shaft integrally forms a coaxial output gear, and an end of the output gear is inserted into the hollow cylinder.

9. The gearbox of claim 7, wherein an annular groove is formed at a junction of the hollow cylinder and the connecting plate, a sealing ring is mounted in the annular groove, and the sealing ring is sandwiched between the hub and the junction.

10. A gearbox comprising:
a main housing comprising a receiving chamber for receiving a worm wheel and a hub at a center of a bottom of the receiving chamber;
a cover mounted to an opening of the receiving chamber,
a worm wheel mounted in the receiving chamber, and
an output shaft mounted to a center of the worm wheel and coaxially rotatable with the worm wheel,
wherein the output shaft extends outwardly through the hub via the receiving chamber, and the hub directly supports one of the worm wheel and the output shaft, and
wherein the worm wheel comprises an annular body with teeth and a connecting plate connected to an inner surface of the annular body, a center of a side of the connecting plate away from the cover comprises a hollow cylinder and a boss disposed in the hollow cylinder, a radial gap is formed between the hollow cylinder and the boss, a first end of the output shaft adjacent the worm wheel is hollow and inserted into the gap, and the hollow cylinder is supported by the hub.

11. The gearbox of claim 10, wherein an outer circumferential surface of the output shaft comprises an annular locking groove, an inward flange is formed at an opening of the hollow cylinder, and the inward flange engages with the locking groove for preventing the output shaft from becoming disengaged from the worm wheel.

12. The gearbox of claim 1, wherein the limiting blocks of the cover comprise multiple sector-shaped blocks or triangular blocks arranged in a circle.

* * * * *